(12) United States Patent
Aravamudan et al.

(10) Patent No.: US 11,516,531 B2
(45) Date of Patent: Nov. 29, 2022

(54) METHODS OF AND SYSTEMS FOR CONTENT SEARCH BASED ON ENVIRONMENT SAMPLING

(71) Applicant: VEVEO, INC., Andover, MA (US)

(72) Inventors: Murali Aravamudan, Andover, MA (US); Ajit Rajasekharan, West Windsor, NJ (US)

(73) Assignee: VEVEO, INC., Andover, MA (US)

( * ) Notice: Subject to any disclaimer, the term of this patent is extended or adjusted under 35 U.S.C. 154(b) by 0 days.

(21) Appl. No.: 16/674,338

(22) Filed: Nov. 5, 2019

(65) Prior Publication Data

US 2020/0145712 A1 May 7, 2020

Related U.S. Application Data

(63) Continuation of application No. 15/676,764, filed on Aug. 14, 2017, now Pat. No. 10,506,274, which is a
(Continued)

(51) Int. Cl.
*H04N 21/4223* (2011.01)
*H04N 21/2187* (2011.01)
(Continued)

(52) U.S. Cl.
CPC ..... *H04N 21/4223* (2013.01); *H04N 21/2187* (2013.01); *H04N 21/23* (2013.01); *H04N 21/235* (2013.01); *H04N 21/25* (2013.01); *H04N 21/258* (2013.01); *H04N 21/2542* (2013.01); *H04N 21/41407* (2013.01); *H04N 21/44218* (2013.01); *H04N 21/4524* (2013.01); *H04N 21/4532* (2013.01); *H04N 21/47* (2013.01); *H04N 21/4722* (2013.01); *H04N 21/4725* (2013.01); *H04N 21/47815* (2013.01)

(58) Field of Classification Search
CPC ........... H04N 21/4223; H04N 21/2187; H04N 21/4722; H04N 21/23; H04N 21/235; H04N 21/258; H04N 21/4725; H04N 21/4524; H04N 21/25; H04N 21/4532; H04N 21/2542; H04N 21/47; H04N 21/41407; H04N 21/44218; H04N 21/47815
See application file for complete search history.

(56) References Cited

U.S. PATENT DOCUMENTS

| 2007/0106721 A1* | 5/2007 | Schloter | G06F 16/951 709/200 |
| 2009/0102859 A1* | 4/2009 | Athsani | G06F 3/011 345/619 |

(Continued)

*Primary Examiner* — Nay A Maung
*Assistant Examiner* — Jose M Torres
(74) *Attorney, Agent, or Firm* — Haley Guiliano LLP

(57) ABSTRACT

The present disclosure provides user interface methods of and systems for displaying at least one available action overlaid on an image, comprising displaying an image; selecting at least one action and assigning a ranking weight thereto based on at least one of (1) image content, (2) current device location, (3) location at which the image was taken, (4) date of capturing the image; (5) time of capturing the image; and (6) a user preference signature representing prior actions chosen by a user and content preferences learned about the user; and ranking the at least one action based on its assigned ranking weight.

20 Claims, 10 Drawing Sheets

Related U.S. Application Data continuation of application No. 13/345,119, filed on Jan. 6, 2012, now Pat. No. 9,736,524.

(60) Provisional application No. 61/430,310, filed on Jan. 6, 2011.

(51) Int. Cl.
| | |
|---|---|
| *H04N 21/4722* | (2011.01) |
| *H04N 21/23* | (2011.01) |
| *H04N 21/235* | (2011.01) |
| *H04N 21/258* | (2011.01) |
| *H04N 21/4725* | (2011.01) |
| *H04N 21/45* | (2011.01) |
| *H04N 21/25* | (2011.01) |
| *H04N 21/254* | (2011.01) |
| *H04N 21/47* | (2011.01) |
| *H04N 21/414* | (2011.01) |
| *H04N 21/442* | (2011.01) |
| *H04N 21/478* | (2011.01) |

(56) References Cited

U.S. PATENT DOCUMENTS

| | | | | |
|---|---|---|---|---|
| 2009/0215471 | A1* | 8/2009 | Sands | H04M 1/72427 455/457 |
| 2009/0319181 | A1* | 12/2009 | Khosravy | G06F 1/1694 701/532 |
| 2010/0048242 | A1* | 2/2010 | Rhoads | G06F 16/50 455/556.1 |
| 2011/0038509 | A1* | 2/2011 | Wang | G06T 7/73 382/106 |
| 2011/0244919 | A1* | 10/2011 | Aller | G06Q 30/0281 455/556.1 |

* cited by examiner

PRIOR ART

SEARCH – WITH
CAMERA INPUT

ACTION LIST ON
AN IMAGE IN
CAMERA LIBRARY

METHODS OF AND SYSTEMS FOR CONTENT SEARCH BASED ON ENVIRONMENT SAMPLING

CROSS-REFERENCE TO RELATED APPLICATIONS

This application is a continuation of U.S. patent application Ser. No. 15/676,764, now allowed, filed Aug. 14, 2017, which is a continuation of U.S. patent application Ser. No. 13/345,119, filed Jan. 6, 2012, now U.S. Pat. No. 9,736,524, which claims the benefit under 35 U.S.C. § 119(e) of U.S. Provisional Patent Application No. 61/430,310, filed Jan. 6, 2011, entitled Method of and System for Content Search Based on Environment Sampling, the contents of which are incorporated by reference herein in their entirety.

FIELD OF THE DISCLOSURE

The present method and system relate to a live capture image recognition interface for camera-equipped mobile devices such as smart phones and hand-held tablets.

BACKGROUND OF THE DISCLOSURE

Description of Related Art

Camera-equipped mobile phones with resolutions rivaling standalone cameras have become the norm, making social interactions richer with the addition of images and videos that capture the moment. Concurrent with this change, applications for using a camera as an input medium for specific use cases are also emerging, similar to text input using a keypad.

For instance, FIG. 10 illustrates that some search engines on mobile devices place a camera icon alongside a text input search box to encourage users to take a picture and use the picture to serve as input for the search engine, instead of text-input-based search. The search engine may further use the user's location to aid the picture. The application then displays the search results as in any conventional text-based search engine. GOOGLE "goggles" similarly places a camera icon adjacent to the text input box. A user uses the application to take a picture of a scene, and performs a search using the capture image or text. The application captures all text in the range of view and uses the text as input to search. The application then displays the results as in a conventional text-based search engine. Commerce-centric applications use a camera as an input means to take an image snapshot of a barcode to provide comparative pricing information. Some mobile devices are experimenting with having a hardware camera button, similar to keypad hardware for text input, to launch a camera and perform typical actions such as sharing a picture with a friend or upload the picture to a photo sharing site.

In an MIT Media Lab project on wearable computers, the "sixth sense" device system uses a camera as an input means to sample the environment. The system aims to bring the digital world to the real world and vice versa. Gesture interfaces with hands serve as cues to capture an image and projections of a phone keypad on the palm of the user's hands. The gesture interface is used as a means to enter a phone number and make a call. Furthermore, the gesture interface is used to find additional information about an object such as a book, as the user looks at the book, and to project price information, etc. on the physical book. The MIT Media Lab project is not a phone-based interface, though it uses a camera as an input interface to sample the surrounding visual environment and interact with it.

Users have to be aware of applications that are capable of using camera as the input medium. More importantly, users must pick the right application for a particular use case. As illustrated in FIG. 10, some phones offer a choice of actions after an image is taken such as uploading the image, saving to a photo library, or emailing to friends. This actions list could expand to include more use cases (commerce enabling, image input based search etc.). One drawback of such an approach, particularly on a mobile device, is inundating the user with a multitude of choices which makes the process so cumbersome. This difficulty thereby decreases the likelihood of its mass acceptance as a powerful and easy alternative to text input. Furthermore, adding more actions to an actions list would make it appear easier to choose a specific application up front than having to navigate through a long list of potential actions in a centralized input interface once a picture is taken.

SUMMARY OF THE DISCLOSURE

The present disclosure provides user interface methods of and systems for displaying at least one available action overlaid on an image, including displaying an image; selecting at least one action and assigning a ranking weight thereto based on at least one of (1) image content, (2) current device location, (3) location at which the image was taken, (4) date of capturing the image; (5) time of capturing the image; and (6) a user preference signature representing prior actions chosen by a user and content preferences learned about the user; and ranking the at least one action based on its assigned ranking weight.

Under another aspect of the invention, the method also includes displaying the at least one action in the ranked order.

Under another aspect of the invention, the image is an image of a portion of an environment surrounding the user.

Under another aspect of the invention, the selecting at least one action and assigning a ranking weight thereto includes determining the ranking weight by a machine learning process.

Under another aspect of the invention, the method also includes selecting the highest ranked action in response to activation of a hardware camera button.

Under another aspect of the invention, the method also includes analyzing the image to learn about the image content.

Under a further aspect of the invention, the method also includes using at least one of the location of the device and the location at which the image was taken to augment the analyzing the image to learn about the image content.

Under a still further aspect of the invention, the one or more actions include an action to purchase an item corresponding to the displayed image from an online storefront corresponding to a physical storefront, if the device's location is proximate to the physical storefront.

Under another aspect of the invention, the analyzing the image to learn about the image content includes comparing the image against a collection of at least one sample image to determine the image content.

Under a further aspect of the invention, the analyzing the image to learn about the image content includes using optical character recognition to learn about textual image content.

Under another aspect of the invention, the analyzing the image to learn about the image content includes analyzing at least one partial image selected based on a proximity of the at least one partial image to a visual field of interest for the user.

Under another aspect of the invention, the method also includes storing the image to a memory along with data about at least one of the location of the device, the date at which the image was captured, and the time at which the image was captured; and displaying the at least one action in the ranked order when the user later acts upon the stored image.

Under another aspect of the invention, the method also includes updating the user preference signature to include information about the action chosen by the user from among the one or more ordered actions.

Under still a further aspect of the invention, a system for displaying at least one available action overlaid on an image includes a computer memory store comprising instructions in computer readable form that when executed cause a computer system to perform any of the actions set forth above.

Any of the above aspects may be combined with any of the other aspects above.

BRIEF DESCRIPTION OF THE DRAWINGS

For a more complete understanding of various embodiments, reference is now made to the following descriptions taken in connection with the accompanying drawings in which.

DETAILED DESCRIPTION OF EMBODIMENTS

The present disclosure relates to a live capture incremental image recognition interface for camera-equipped mobile devices such as smart phones and hand-held tablets. The present system allows a user to perform context-sensitive actions, including content discovery, on the surrounding visual environment, using image capture or video capture from a mobile device camera as input. The context is a combination of one or more of the following factors: image content, location of the mobile device, location at which the image was taken, date and/or time of capturing the image, and a set of user preferences learned from the user's past actions such as the user's previous action list navigation and selection behavior (also referred to as a "user signature" herein).

The term "smart phones" refers to phones with capabilities beyond just making voice calls.

Figure 9:
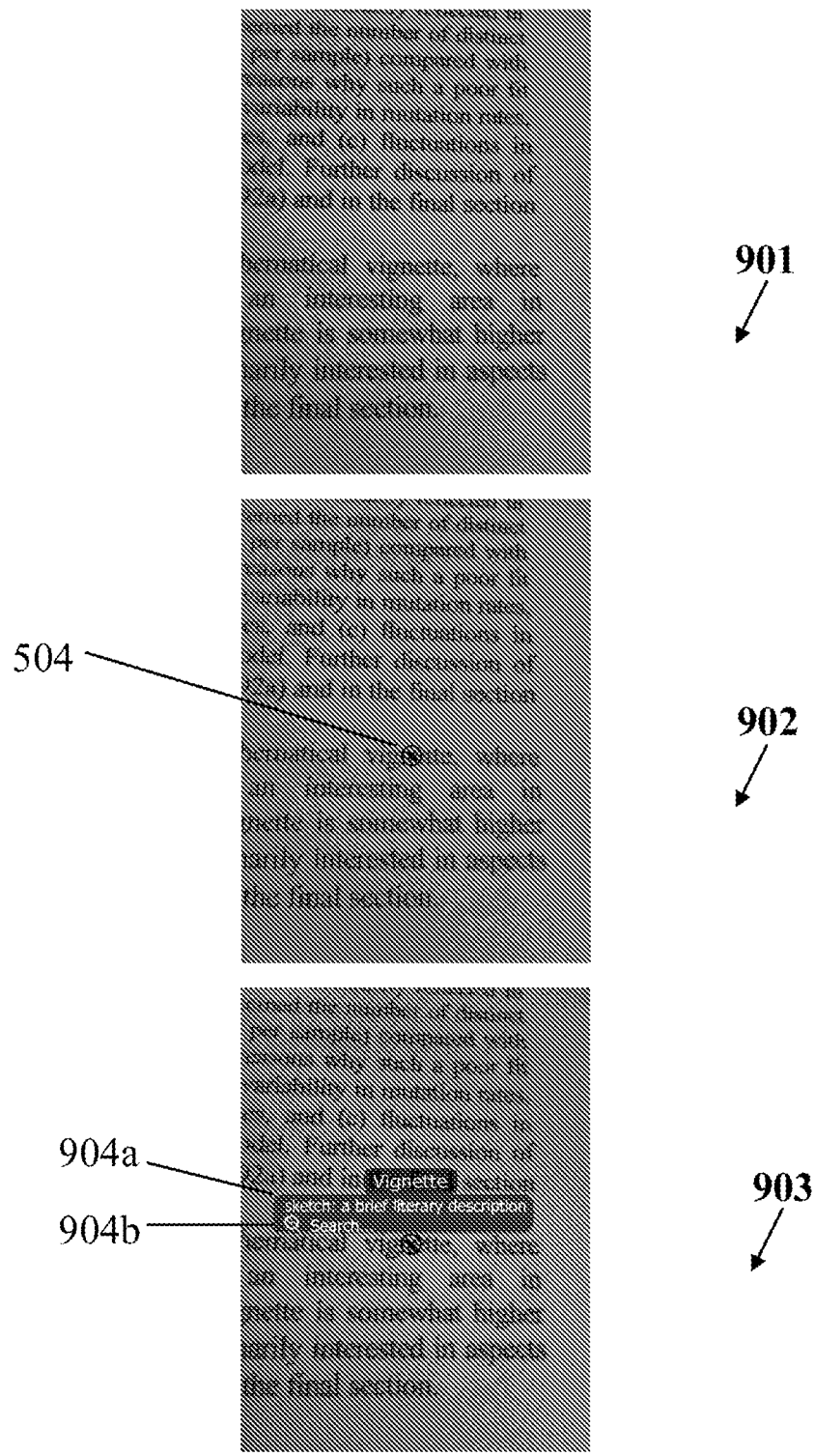
FIG. 9 illustrates the live image capture user interface in which the user performs an action on an image of a page of a book sampled from the surrounding environment.
Figure 10:
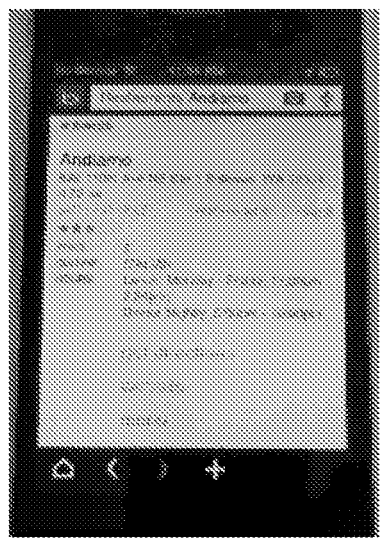
FIG. 10 illustrates existing input interfaces for receiving camera-based input.
Figure 10:
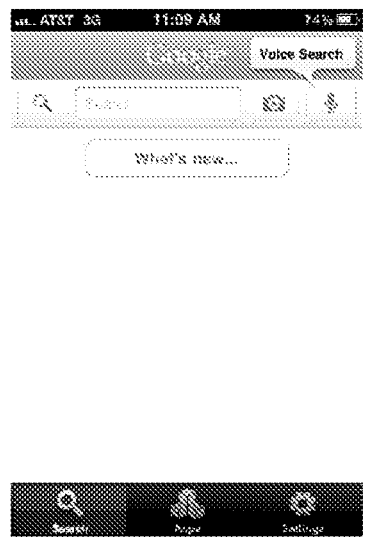
Figure 10:

FIG. 10 illustrates prior art existing input interfaces for receiving camera-based input. Preferred embodiments and their advantages may be understood by referring to FIGS. 1-9, wherein like reference numerals refer to like elements.

While there is a distinct advantage to having a centralized image- or video-driven input interface for performing actions based on an image or video taken by a camera, the input interface is further improved by incorporating context. In some embodiments, a centralized image/video-driven input includes a hardware camera button, operating-system-level or phone-interaction-shell-level integration, and/or a standalone camera application. Actions based on an image or video include using the image or video as input into a search engine. Context allows the input interface to offer likely actions of interest to the user, and to order the actions according to their likelihood of relevance to the user at that point in time and location. A centralized interface that fails to account for context can make the user experience cumbersome, thereby decreasing the effectiveness of a centralized user interface. Users may gravitate to use-case-specific "camera-input"-capable applications. Use-case-specific applications have the disadvantage of the user not rapidly discovering new "camera-input-aware applications" as more applications add support for image and video input.

As semantic recognition of images improves over time and the wide gap between human image recognition capability and computer-driven image recognition decreases, visual image input is poised to become a centralized efficient input interface to express user interest in the surrounding visual environment, and for the system to understand user interest unambiguously. This stands in stark contrast to a centralized text input interface, where the user intent is harder to interpret unambiguously. In a centralized text input interface, ambiguity arises because it is harder to infer if a user's interest is based on the current environment, or decoupled from it.

For instance, a user in a store remembers to respond to an email, make a phone call, or has an urge to find a nearby coffee shop to grab coffee. These are thoughts that suddenly occur to the user. To infer that the user is in a store (e.g., based on obtaining a position estimate for the device) and to offer information about things around him in the store as soon as the user opens the mobile device or enters text into a centralized input interface, may not yield useful results. Even with text input search that is location-aware and focused on store results, store-specific search results may result in ranking and ordering results mentioning the nearby coffee shop lower. For example, assume a user has entered a text search for "coffee." In a book store, an input interface taking location into account may return search results representing books on coffee. In a grocery store, the same input interface may return search results representing brands of coffee. The number of store objects in the immediate vicinity of the user would be so high that location-sensitive text input search results would push down results mentioning even a nearby coffee shop, due to the high relevance boost of immediate objects. However, if the user takes a picture of something in a store, then the intent of the user is unambiguous when he wants to perform an action on the image. The user's intent is unambiguous even if the user selects the action later at a different location. Text input and speech input into a centralized input interface to express a user's interest in the surrounding environment are always burdened by ambiguity inherent in interpreting human thought or intent, regardless of the context of date and/or time and location.

Image input, in contrast, is a direct sampling of the environment around the user. Image input has a distinct advantage over text input or speech input as a better candidate for a centralized interface to understand user interest in a surrounding environment. Image input is perhaps the best and always relevant sampling, like human vision, to understand the environment. For example, even in darkness a user or an input interface can use a camera flash to capture the environment. Furthermore, other sensory modalities such as auditory, olfactory, tactile, and gustatory senses, are also applicable. For example, a centralized input interface uses auditory analysis to sample a bird's cry and identify its species. Thus, while embodiments of the present disclosure are described in terms of image input, other sensory modalities can be used as input and remain within the scope of the disclosure.

As speech recognition improves, over time it will supersede text in many scenarios as an input interface to express user intent decoupled from the surrounding environment. For example, a user uses speech to search for a contact to make a call, remember to respond to an email, make a note to himself or herself, or find directions to a place. Meanwhile, a camera-based input interface will become an input interface augmenting a text/speech interface, to sample a surrounding environment and act upon the sampled image or video. These two broad categories of input interfaces, (1) speech- or text-based and (2) camera-based, will continue to co-exist and evolve as recognition technologies improve. Embodiments of the present disclosure facilitate using a camera-based centralized input interface to augment text/speech interfaces and improve efficacy of a centralized input interface. The present system and method improve the ease of sampling the surrounding environment's visual field, and the ease of performing an action that likely matches the user's intent.

Figure 1:
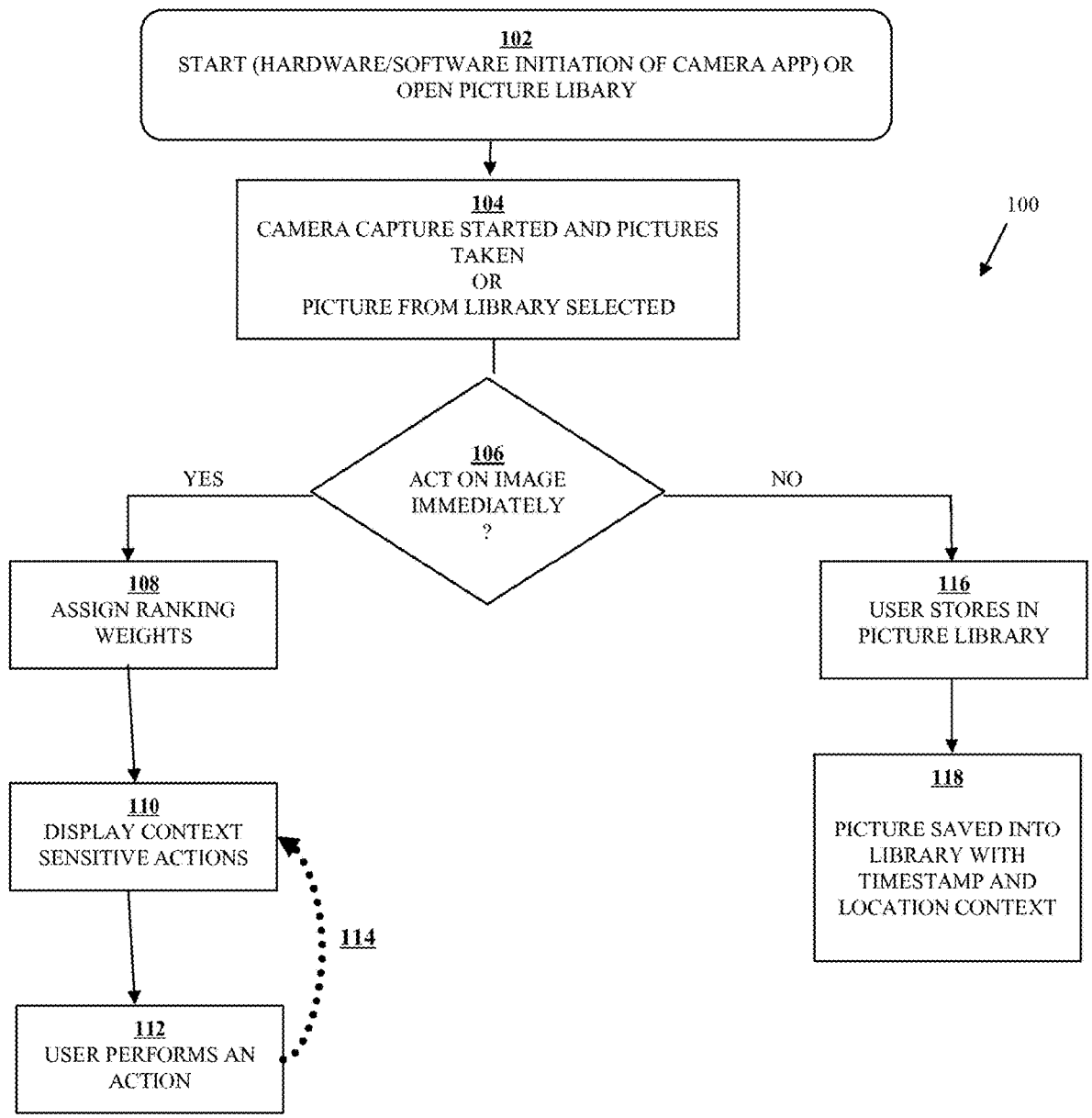
FIG. 1 illustrates a high-level flow chart of a process for using a camera as a centralized input interface for performing actions on images captured live and on images stored for deferred action.

Turning now to the drawings, FIG. 1 illustrates a high-level flow chart of a process 100 for using a camera as a centralized input interface for performing actions on images captured live and/or on images stored for deferred action. The user interface receives a command to start a camera, or receives a command to open a picture library (step 102). In some embodiments, the user interface responds to a user starting the camera using a hardware button to trigger the camera, a camera application on the phone, or any application that has an interface to initiate the camera hardware. In another embodiment, the user interface responds to a command to open a picture library that stores images taken earlier. The user interface receives a command to take a desired picture or video with the camera, or receives a command to select a picture from the picture library (step 104). Once the camera takes the picture or video, the present system acts upon the image. The present system allows the user to decide whether to act upon the image immediately (step 106). If the user decides to act upon the image immediately, the present system assigns a ranking weight to an available action (step 108). The user interface displays a set of context sensitive actions based on the assigned ranking weights (step 110). The weighting and display of the context-sensitive actions factor in one or more of the following factors: (1) content of the image, (2) current device location, (3) location at which the image was taken, (4) date and/or time, and (5) user preferences learned from prior user actions. The user selects a context-sensitive action (step 112). As described below, in some embodiments, the user's selection is fed back into the present system to assist in future weightings (step 114).

In some embodiments, the present system does not require analysis or recognition of the image content. For example, the present system makes the user experience effective in many scenarios with just one or more of the following factors: current device location, location at which the image was taken, image capture location, date and/or time, and user preferences learned from the user's past actions, without needing the image to be processed at all. For example, if the user is in an electronics or book store, the act of triggering a camera click on the phone displays a web site or application associated with the electronics or book store. One advantage of displaying the web site or application associated with the store is that the interaction assists the store to sell alternative options or products on sale to an undecided customer, should the customer find the price of his desired product not competitively priced relative to another store.

Accordingly, the centralized camera input interface serves as a context-sensitive method to bring the user to relevant web sites to help him make informed decisions, without processing, analyzing, recognizing, or using the image content. This usage of the camera, even without using the image content for determining context, is still superior to a centralized text input interface. In a centralized text input interface, the location of the user could be used to automatically push a relevant site or information. However, as described earlier, the user's location may not match the user's intent. Instead, the act of using a camera click to sample the environment is a clear signal of a user's interest in that location. Accordingly, showing location-specific information, automatically in this case, has a higher likelihood of matching a user's intent compared to a centralized text input interface with automatic location-specific information push.

In other embodiments, the present system leverages image content to tailor the actions displayed to the user, based on information determined from the image. Recognition algorithms used to determine image content include: coarse granularity recognition of face or object contours, barcode recognition, OCR (Optical Character Recognition), or more sophisticated recognition methods. In some embodiments, the input interface uses coarse granularity recognition of face contours to prompt the user to share the picture or save the picture to the photo library. In other embodiments, the input interface uses optical character recognition to facilitate recognition of objects in a store, and to help the user gain more information about the objects. Brick and mortar stores can suffer from an inability to cater to visiting customers' questions and risk losing customers. Recognition of objects in the store, facilitated by information already in stores' online sites or applications, offers more information on an object of interest from the store's own site. Furthermore, image recognition coupled with navigating a user to a store's web site or application provides opportunities for up-selling with online promotions.

In further embodiments, the input interface uses coarse granularity recognition of edge detection to highlight clickable active regions in an image. The highlighted regions denote availability of further information. In a crosshair exploration mode, a crosshair in the center of the field of vision blinks at a periodic rate when latching or recognizing an image of an object in a field of view. The input interface instantly provides information on the object once the input interface recognizes the image of the object. If the input interface does not recognize an image of an object, the user is able to infer implicitly that the object is not recognizable, and reorient the mobile device to try a different zoom or angle. In some embodiments, recognition of barcodes on product labels, combined with a current location of the device, shows price comparisons for a product, including any online price promotions in the same store. Advantageously, the present system facilitates retention of the customer in the brick and mortar store in the face of online price comparisons which allow the customer to do optimal shopping.

In some embodiments, the list of actions overlaid on an image (step 110) is based on inferred details of the image content (if available), the current location of the device, and the date and/or time. For example, once the input interface infers based on details of the image content that the user is scanning a bar code, the input interface assigns lower ranking weights to actions of sharing the image or emailing the image, and assigns higher ranking weights to actions of price comparison and online purchase for the product corresponding to the bar code of interest.

When the input interface receives a selected action from the action list (step 112), the input interface feeds the user's choice back to the present system (step 114) to update a user signature. As described above, a user signature refers to a set of user preferences learned from the user's past actions and/or behavior. The user signature includes information reflecting the user's preferences and activities, such as temporal and location-based components, including a timestamp of the user's search, and/or the user's location. Techniques for generating a user signature based on user preferences, activities, and behavior include, but are not limited to, those disclosed in U.S. Pat. No. 7,792,815, entitled Methods and Systems for Selecting and Presenting Content based on Context Sensitive User Preferences, filed Mar. 6, 2007, and U.S. Pat. No. 7,949,627, entitled Methods and Systems for Selecting and Presenting Content based on Learned Periodicity of User Content Selection, filed Jul. 26, 2010, the contents of which are incorporated by reference herein. This user signature feedback assists in improving future ranking and display of action choices to match user preferences. The system learns user behavior to improve the user experience, by modifying the action list to match the user's interest.

If the user does not choose to act upon the image immediately (step 106), the user interface receives a command to store the captured image or video in the photo library (step 116). In this deferred mode of action on a stored image, the present system stores the date and/or time and optionally the current device location information along with the image in the library (step 118). Associating the date and/or time and current device location information with the stored image facilitates future ranking and displaying of the action list to match the user's intent later, when he/she decides to act upon the stored image (step 104). In one embodiment, the action to store a captured image into the library is the default action. In a further embodiment, the input interface does not display any other action. Instead, the input interface defers the display of the ranked and ordered list of actions to when the input interface receives a user selection of a stored picture from the photo library.

Figure 2:
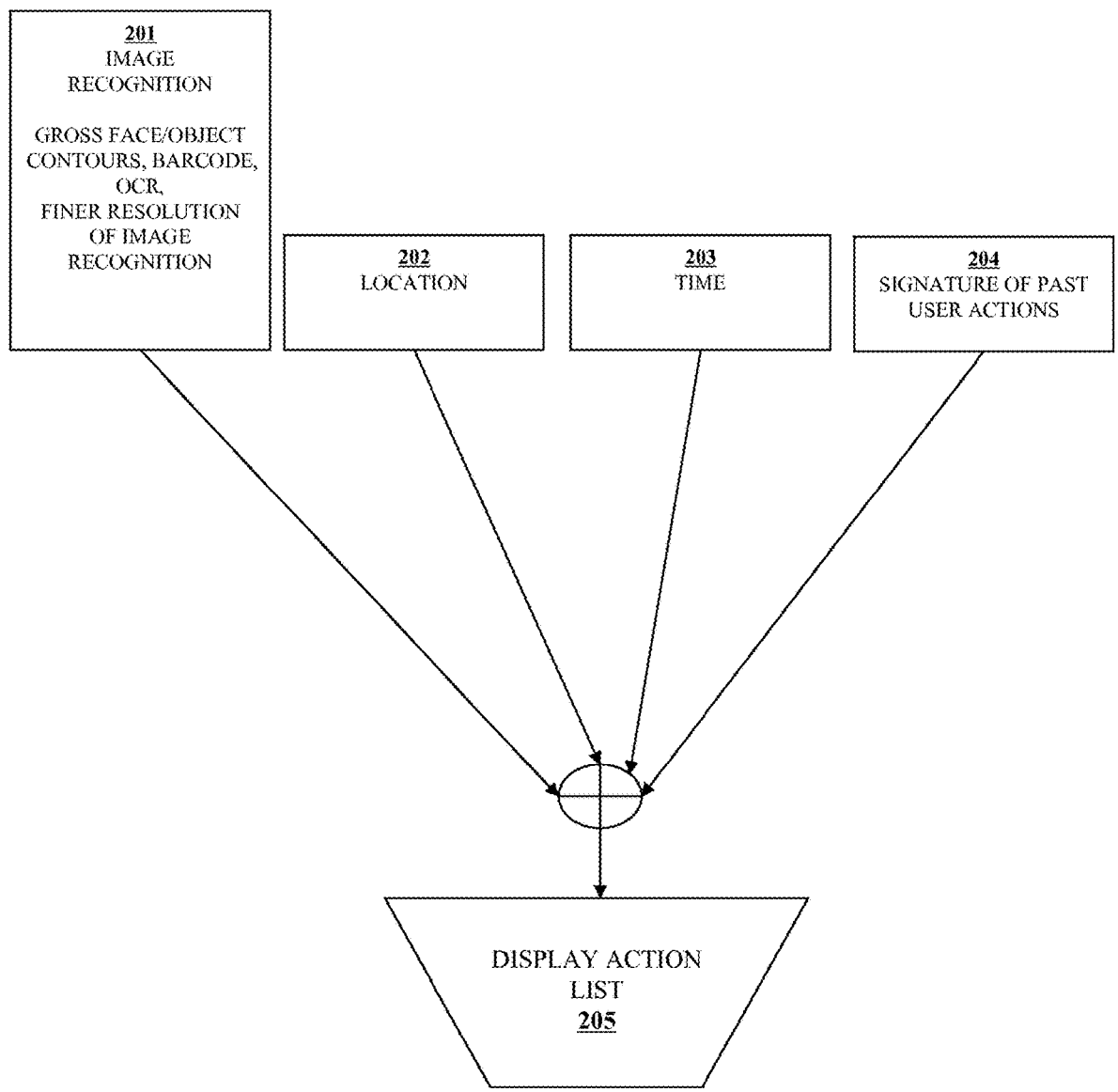
FIG. 2 illustrates factors, at least one of which influences the displayed action list to the user.

FIG. 2 illustrates factors 201-204, at least one of which influences the displayed actions list to the user. As mentioned earlier, image recognition 201 is not a mandatory factor, just as factors 202-204 are not mandatory. Image recognition 201, if used, can occur on the mobile device, or can occur partially or completely on a remote server. If image recognition 201 occurs on a remote server, the present system uses a communication method to transmit images to the remote server, particularly in a live usage interface as described in further detail below. Optionally, image recognition 201 has different levels of granularity, from coarse feature extraction or recognition to fine-grained recognition, and different types of recognition occurring simultaneously, e.g., barcode detection or OCR. As image recognition algorithms evolve and improve, the improved algorithms increase the likelihood of matching the user's intent by ranking and ordering the list of actions displayed to the user.

In some embodiments, the present system combines OCR image recognition with location information 202 to improve recognition of the surrounding environment. Location estimation technology currently used in mobile devices can supply an estimate of the current device location and/or the location at which the image was taken. Example location estimation technologies include, but are not limited to, GPS (Global Positioning System) satellite-based location systems, Wi-Fi wireless-local-area-network-based location systems, and/or cellular-tower-based location systems.

For example, the present system combines knowledge of the user's location in a BARNES AND NOBLE book store to increase recognition rate by compensating for OCR errors. The present system uses online book store information to compensate for OCR recognition errors. For example, assume the user is in a brick-and-mortar book store. As described below in connection with FIGS. 5-6, the input interface uses information derived from an online counterpart to the brick-and-mortar book store to correct OCR recognition errors arising from recognizing an image of a book. In further embodiments, the present system uses (1) output text from OCR recognition, which contains errors in text recognition, and (2) the current device location or the location at which the image was taken, to generate input into an incremental search engine. An incremental search engine can receive input with errors which is partially complete (e.g., incomplete prefixes and suffixes with errors and loss of characters within words), and use the input to generate possible action candidates as output. Optionally, the present system uses date and/or time 203 to leverage repetitive or episodic patterns of user behavior. Optionally, the present system uses a partial or complete signature of past user actions 204 to influence the ranking and ordering of the actions list 205, as described in further detail below.

Figure 3:
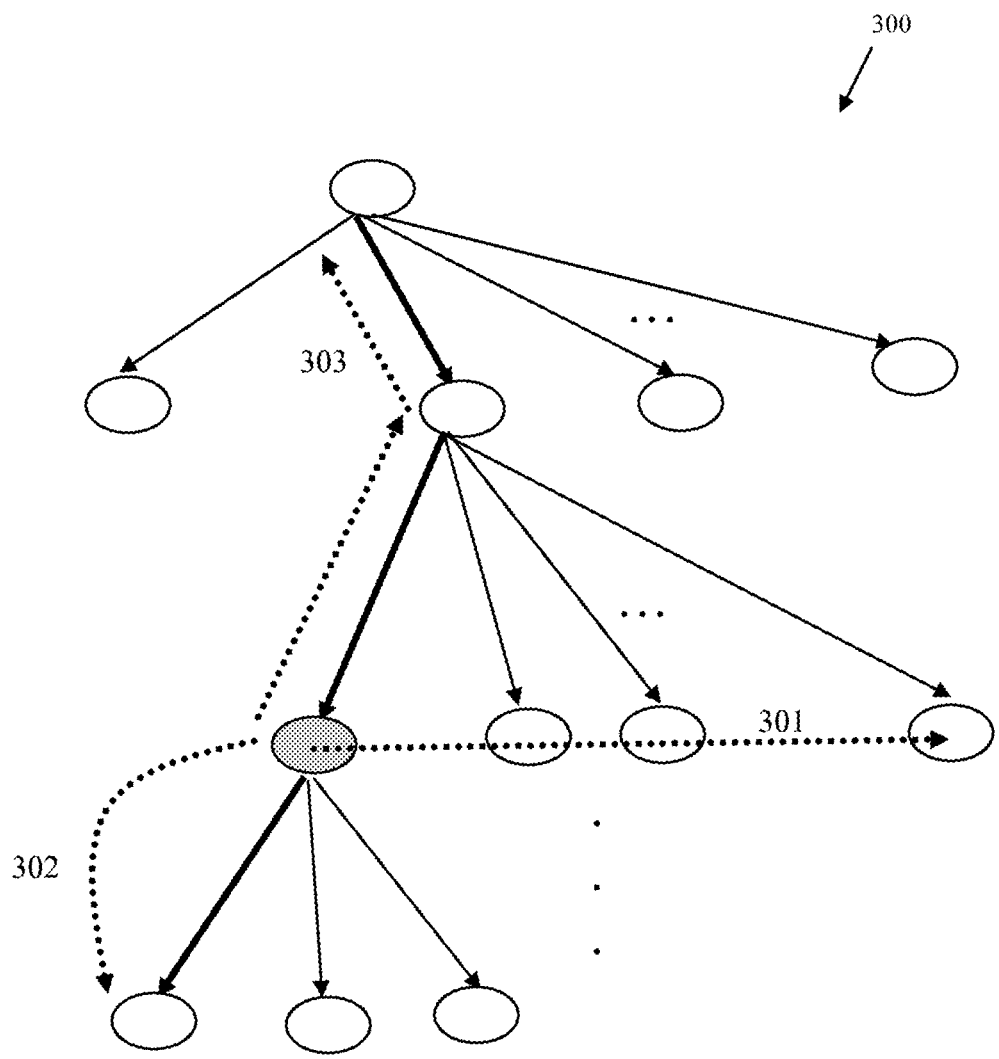
FIG. 3 illustrates an actions tree for actions exposed to a user for an image.

FIG. 3 illustrates an actions tree 300 exposed to a user for an image. The present system supports user navigation down to a node in the tree, and learning of user actions that can percolate a node up to the root node over time.

It is instructive to compare the improvement in user experience offered by a camera-driven input interface in comparison to a text input interface, and the potential of a camera-driven input interface as improvements in recognition algorithms allow for recognition of more objects in a surrounding environment. In a text-input-based interface, a user goes through three steps to select an action: (1) the text input system suggests words or phrases to complete words or phrases which a user enters, (2) the text input system displays results to match the user's text input, and (3) the text input system displays a list of available actions for each result. Image recognition, in the best case, eliminates the first two steps (phrase completion and results navigation). A user chooses directly from an actionable list based on an object of interest. Eliminating these two steps of phrase completion and results navigation represents a significant improvement in user experience on a mobile device, on which minimizing interactions dramatically improves a user interface.

FIG. 3 further illustrates how the user experience can be improved by optimizing the tree to reduce the navigation needed for the user to arrive at the desired action. The nodes in the actions tree represent potential actions for the input interface to display to a user. The nodes which the user visits repetitively percolate up the navigation hierarchy over time. Techniques for modifying user navigation content based on previous user navigation and selection include, but are not limited to, those disclosed in U.S. Pat. No. 7,461,061, entitled User interface methods and systems for selecting and presenting content based on user navigation and selection actions associated with the content, filed Apr. 20, 2007, the contents of which are incorporated by reference herein. The forward navigation path 302 to a node, down a hierarchy 301, reduces over time as nodes percolate up the hierarchy 303 as the system learns and creates a signature of user's navigation behavior.

In another embodiment, the present system leverages a hardware camera button to select automatically the highest ranked action, without displaying the actions list or requiring input from the user. Certain mobile devices provide a hardware "camera" button to allow users to take a picture or video of an "impromptu" moment with ease. In contrast, other mobile devices require a user to find an on-screen action button which introduces unwanted delay into the picture-taking process. In mobile devices with a hardware camera button, in response to activation of the hardware camera button, the input interface captures an image or video as desired, and further automatically selects the highest ranked action without displaying the actions list or requiring additional input from the user.

In another embodiment, the present system determines the default ranking and ordering of an action according to a bidding process. The present system determines in advance a ranking and ordering used when displaying an action for a recognized image, based on bids placed by advertisers or companies with an interest in the rank and order of actions associated with the advertiser or company. For example, an advertiser such as an online book store participates in a bidding process to bid on action types, keywords, or smart tags. Action types include objects on which actions are performed, such as books or media. The present system considers parameters including potential or actual revenue from the bids, or how well the bid matches the user's intent, before determining a default action. In some embodiments, the present system determines a default rank and order in advance, on a system remote from the mobile device and independent of the user's current request.

In a further embodiment, the present system uses learning such as machine learning to modify the actions tree 300 to match the user's intent based on a past signature of the user's actions. The learning incorporates the current device location or location at which the image was taken, date and/or time, and/or the navigation path. In this manner, the system accounts for locations which a user often visits and actions which a user often takes, to optimize the navigation path. For example, if the present system receives commands from a user who goes often to a brick-and-mortar book store and buys a book from an online competitor book store after comparing online, the present system uses previous actions which the user often takes, to rank and order the competitor's action higher in comparison to other action options. For example, a user often selects the competitor's action when the user's current location is the brick-and-mortar book store. Even if the brick-and-mortar store's price and corresponding action for the book is slightly cheaper than the price and corresponding action for the online competitor's book, the present system uses the user's previous actions to rank, order, and display the brick-and-mortar store's action below the online store's action.

In another embodiment, the present system uses the current device location or previous stored image location as a context to constrain results to that specific location and to compensate for image recognition errors using knowledge of the specific location. If the mobile device is located in a brick-and-mortar store, the present system identifies an online store equivalent of the brick-and-mortar store, and uses the online store equivalent to compensate for errors in image recognition. For example, the present system constrains search results to those appearing in a book store, electronic store, or museum when the mobile device is in those locations. The present system uses knowledge of the location to further understand if the user is in an environment of high object density, as in a retail store, and uses that information to constrain the search context to within that location. The present system further performs a fine-grained analysis of the location to identify an online store equivalent of the brick-and-mortar store, and then use information from the online store equivalent to compensate for errors in image recognition. Optionally, in addition to an online store equivalent, the present system uses any other digital repository of information relating to the mobile device's current location or the previous stored image location.

Figure 4:
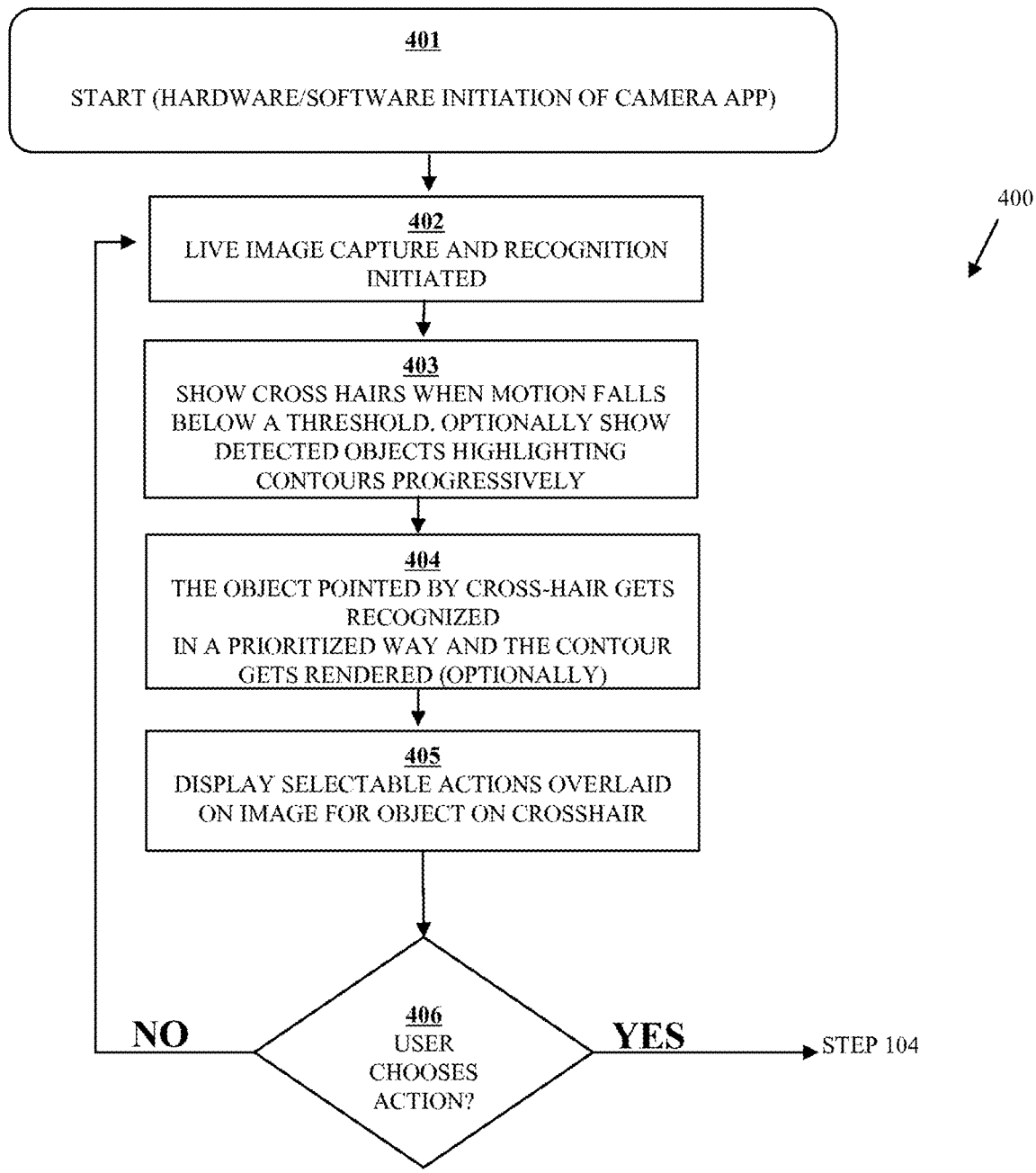
FIG. 4 illustrates a high-level flow chart of a process for ranking and displaying actions based on incremental sampling of a live capture of an image of an object in real time in the surrounding environment.

FIG. 4 illustrates a high-level flow chart for a process 400 of ranking and displaying actions based on incremental sampling a live capture of an image of an object in real time in the surrounding environment. While image recognition technologies have progressed, image recognition is still in its infancy in semantically interpreting a visual scene, a task a child can do easily. Furthermore, even if it is possible to semantically interpret a visual scene, it is an interface challenge to infer the objects that are of interest to the user in the surrounding environment. Overlaying actions on all recognized objects overloads the user with choices, even more than the multitude of choices for a single object. In some embodiments, the present system includes a user interface for live capture mode, where the present system determines a user's object of interest by virtue of a user interface element such as a cross-hair overlaid in the visual field. The user interface element is chosen to be similar to traditional cameras having a range-of-view window.

In an illustrative implementation, the camera-based input interface receives a command to initiate live-image capture and recognition (step 401). In some embodiments, the camera-based input interface receives a trigger from a hardware button or from a centralized input interface that is brought up by a touch screen gesture, touch, or click. In one embodiment, a hardware camera button directly triggers the camera-based live capture interface. In another embodiment, in phones having a hardware keypad, pressing any key triggers a text-based search interface. In a further embodiment, in devices where there is no hardware camera button, a touch screen gesture triggers a centralized input interface with a search input text box, and a software camera button alongside the text box triggers the present live-capture camera input interface.

Once the live capture is initiated (step 402), when a user holds the mobile device steady such that an object falls under a cross-hair, the present system interprets the object under the cross-hair to be the object of interest. In one embodiment, the present system tracks the motion of the mobile device and overlays cross-hairs on the live image capture once the motion of the phone falls to below a threshold to a steady level. The present system begins image recognition, to optimize computation (particularly if the present system performs image recognition on the mobile device) and bandwidth (if the present system performs image recognition on a remote server).

In further embodiments, the present system begins image capture first, and progressively refines incremental image recognition until the camera steadiness reaches a threshold. The present system uses incremental image recognition to determine object contours and active clickable cues with progressive refinement. The input interface overlays object contours and/or active clickable cues progressively on images of objects as the present system incrementally recognizes the objects (step 403).

The present system uses the crosshair to aid incremental recognition of an object in live capture mode. The present system recognizes the object under the crosshair first (step 404). The present system ranks, orders, and displays actions for the object of interest progressively, before recognizing other objects. Advantageously, this incremental image recognition provides quicker feedback and a more responsive input interface compared to current image-input-based applications. In current image-input-based applications, the absence of a cross-hair and lack of incremental image recognition increases response time, and makes user interaction more iterative and cumbersome because of the two stage process. In the two-stage process required by current image-input-based applications, a user takes a snapshot and waits for a response, only to find that the interface did not recognize the object of interest correctly, or in some cases, the interface recognized a different object instead of the object of interest intended by the user. Current image-input-based interfaces then require the user further to zoom in or out and repeat the cumbersome process.

In contrast, the present live capture interface with incremental image recognition makes this process more seamless. From a bandwidth and computation standpoint, the present system lowers bandwidth usage and device computation required for remote image recognition. For example, the present system sends only a region of the image around the cross-hair to a remote server for image recognition. Optionally, the present system uses device-based coarse image analysis to determine this first region intelligently. The present system then dispatches other segments around the first region incrementally to a remote image recognition server, and the remote server combines the image segments for improved recognition. If the present system determines that the segments around the cross-hair are sufficient to recognize the object on the device, the present system aborts dispatching or processing the other image segments. Accordingly, certain embodiments have the advantage of potentially lesser computation and, hence, faster response time to the user by leveraging incremental image recognition based on prioritizing sampling of an image segment indicated by the cross-hair.

The present system using live capture and incremental image recognition allows for multiple sampling and stitching of the visual scene. The present system addresses the problem of when an object is too large to be visible in the range of view for the current zoom, or the problem of when text is too long to fit in the current zoom level, for example when image recognition algorithms require images of letters to be sufficiently large for successful recognition. The present system automatically allows for multiple sampling and stitching of the visual scene since the present system captures the entire image once the input interface receives a command to start capture. In the case of a user scanning text, the present system allows the user to move the cross-hair along the baseline of the text line of interest. The present system prioritizes the object under the crosshair in the recognition process, in preference to other objects in the field of view. Optionally, the cross-hair blinks to indicate that the present system has latched on to the image of the object of interest, and image recognition has begun. At this point, the present system allows the user to bring the phone closer, to interact further with the image of the object of interest. The present system can ignore the motion of the phone while recognition is in progress. In some embodiments, the image remains frozen transiently to indicate the recognition is in progress. The image remains frozen until the user chooses an action, a timeout elapses, or the user cancels recognition.

Advantageously, supporting implicit latching on the best image for recognition and indicating to user that latching has happened eliminates the user's tension that the snapshot may not be the best. Furthermore, since the present system captures multiple images once the user initiates capture, recognition leverages the multiple images to improve the recognition process further. Even when user explicitly chooses a "snap image" action for the image of the object under the cross-hair, if the snapped image is blurred due to motion, the present system leverages images taken prior to the explicit image. The present system automatically displays the list of actions relevant to the object under the cross-hairs without any user action once recognition is complete (step 405).

As described above, the present system ranks and orders actions for display in an actions list. In one embodiment, if the user chooses not to select an action, the input interface switches to live capture mode (step 406). The input interface switches to live capture mode either via a timeout, by receiving a brisk movement indicating that the user is interested in another object, and/or other user operation. If the user chooses to select an action, the present system performs the selected action (step 112, shown in FIG. 1).

Figure 5:
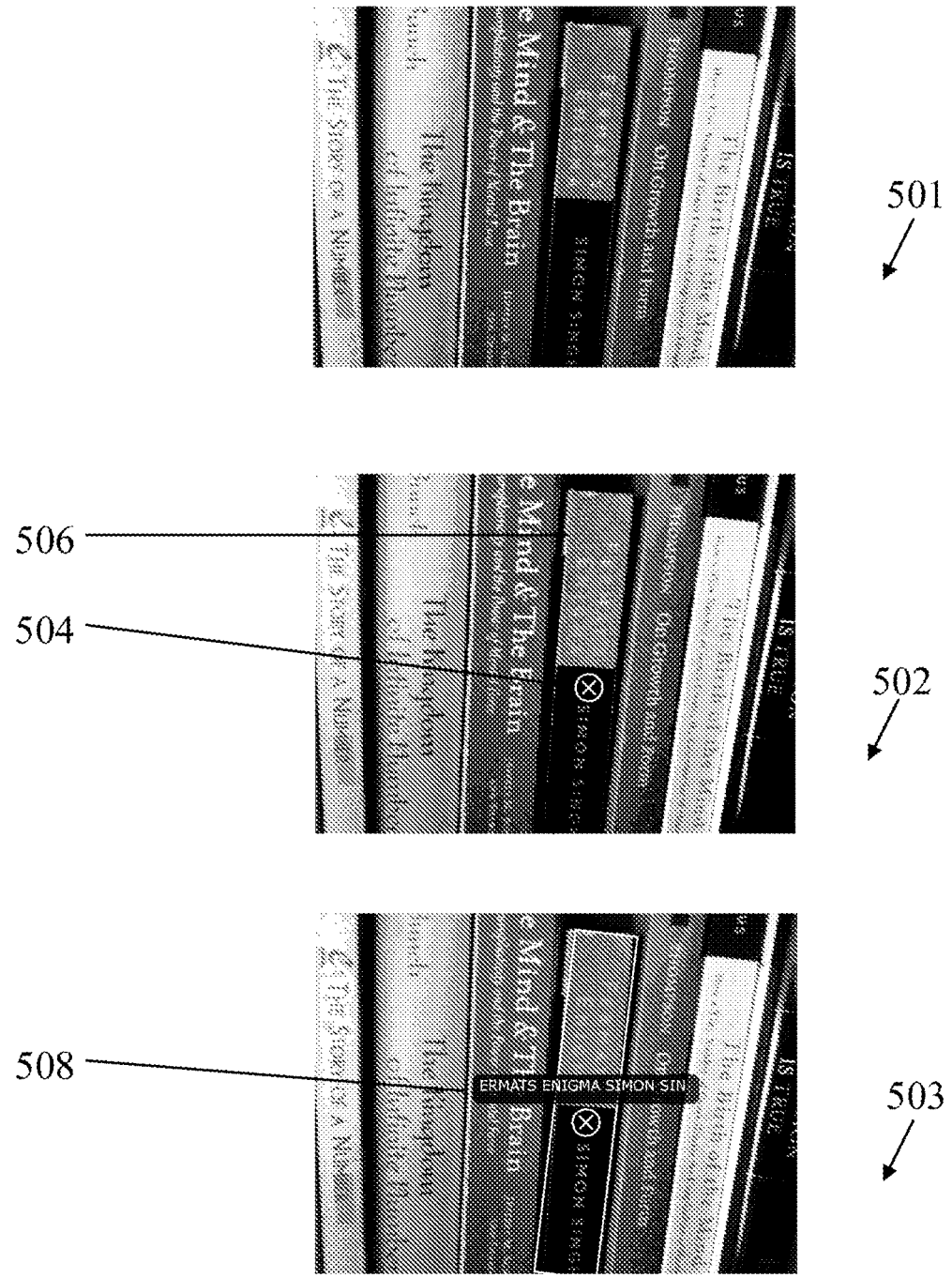
FIG. 5 illustrates initial stages of a live image capture user interface in which a user performs an action on an image of an object sampled from the surrounding environment.

FIG. 5 illustrates initial states of a live image capture user interface in which a user performs an action on an image of an object sampled from the surrounding environment. Image 501 illustrates a live image capture of a bookshelf in a store. In image 502, as the phone movement stabilizes, cross-hairs 504 appear at the center of the field of view over object of interest 506. As described above, cross-hairs 504 aid the user to indicate an object of interest 506 to the present system. In one embodiment, crosshair 504 begins to blink as the latching on object of interest 506 happens, and the present system begins image recognition. Image 503 illustrates display of recognized text. If object of interest 506 under the focus of cross-hair 504 has text, the present system displays the recognized text 508 instantly, to inform the user that image recognition has happened.

Figure 6:
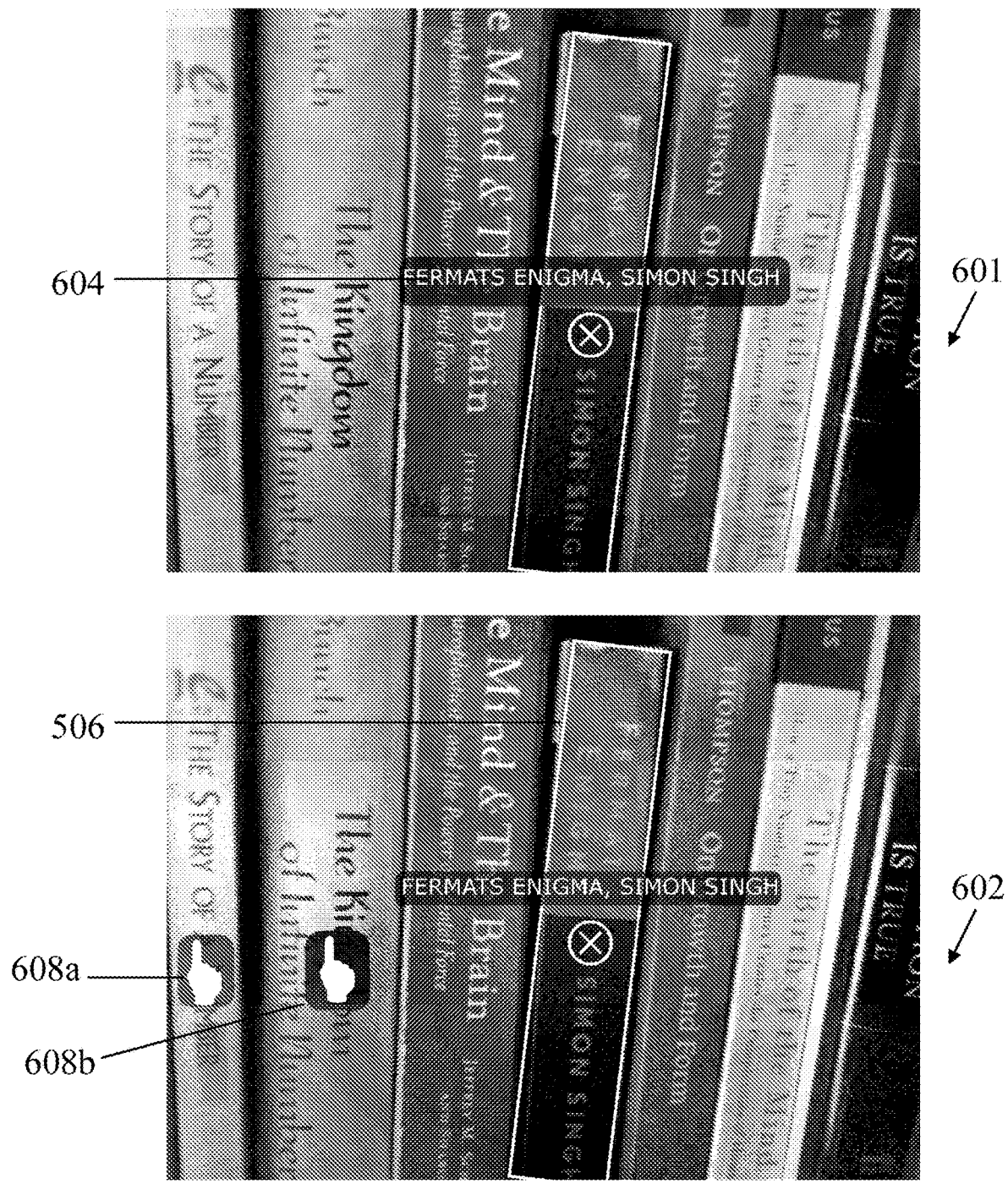
FIG. 6 illustrates intermediate stages of the live image capture user interface where the user performs an action on an image of an object sampled from the surrounding environment.

FIG. 6 illustrates intermediate states of a live image capture user interface in which a user performs an action on an image of an object sampled from the surrounding environment. As described above in connection with FIG. 4, in some embodiments the present system performs incremental image recognition by executing a first phase of image recognition locally on the mobile device where the image recognition is devoid of context and is based purely on recognition of characters. Optionally, the present system dispatches recognized text to a second phase, happening either on the mobile device or remotely on a server. Image 601 illustrates that the second phase uses the context to improve image recognition. For example, the present system uses the context that the mobile device's location is in a book store to use information about other books as the context. As described above, relevant contextual factors include image content, a location of the mobile device, a location where the image was taken, a date and/or time of capturing the image, and a user signature representing the user's past actions.

As illustrated in image 601, the second phase uses the specific book store as the context to correct errors, and displays a corrected string 604. As illustrated in image 503 (shown in FIG. 5), the first phase of recognition has errors in the OCR because the recognized string 508 is "ermats enigma simon sin." The image recognition missed peripheral characters. Other types of errors such as deletion and substitution are also possible. In some embodiments, this error correction step is not a separate phase that persists long enough to display to the user. Instead, as illustrated in image 701 (shown in FIG. 7), if the present system determines actions for the recognized image immediately, the input interface displays the actions instantaneously.

As illustrated in image 602, in some embodiments, image recognition of other objects happens subsequent or concurrent to the object of interest 506, and visual cues 608a, 608b on recognized objects progressively appear as they are recognized. In some embodiments, a pointing finger icon denotes visual cues 608a, 608b. Visual cues 608a, 608b indicate that the user can select the visual cues to perform actions. In some embodiments, when image recognition happens on a remote server, the present system recognizes the other objects in parallel. Optionally, if an object is not recognizable, the present system allows the user to zoom in or zoom out on the object of interest 506, using either hardware or software buttons, to increase the likelihood of recognizing the object of interest 506. The present live capture interface makes this iterative process much simpler, unlike existing systems. In the present live capture interface, the recognition process is faster using the cross-hair approach, and the user experience is more real time. Existing systems use explicit clicking of a button, followed by recognition, and then repeating the cycle again iteratively to capture a good image snapshot.

Figure 7:
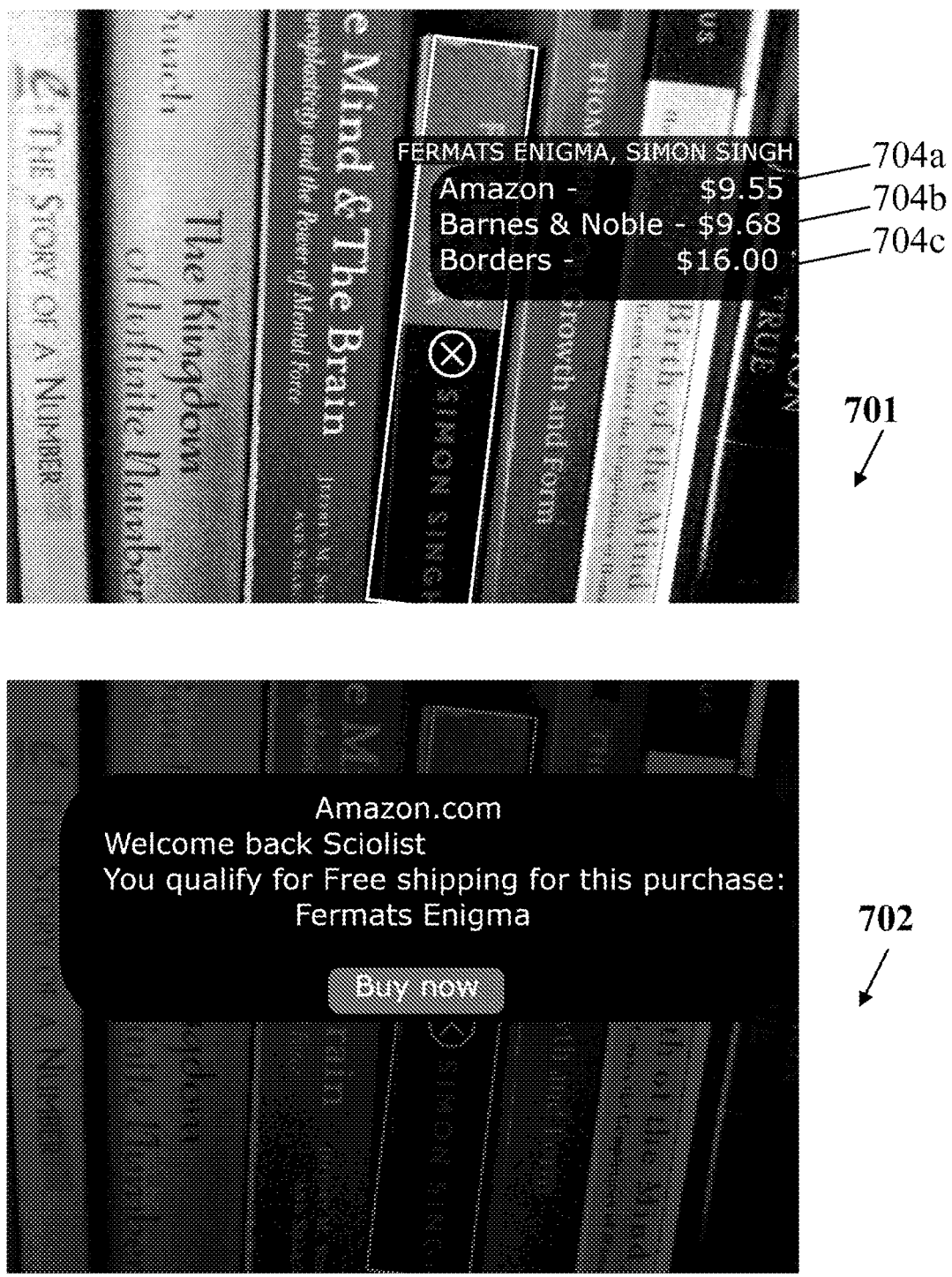
FIG. 7 illustrates final sequences of stages of the live image capture user interface where the user performs an action on an image of an object sampled from the surrounding environment.

FIG. 7 illustrates final sequences of stages of the live image capture user interface where the user performs an action on an image of an object sampled from the surrounding environment. FIG. 7 continues the bookshelf scenario illustrated above where the present system displays actions for a recognized book. Image 701 illustrates that the available actions 704a, 704b, 704c are price comparisons for the book from three booksellers. The input interface allows the user to tap, click, and/or otherwise select a displayed store name and/or a displayed price to initiate an action of navigating to the online site associated with the displayed store name to allow the user to order the book of interest. Image 702 illustrates that the user can select action 704a by touching or clicking to initiate a purchase. In some embodiments, the present system performs the login to the site automatically due to caching of the user's credentials from a previous login. Accordingly, the present system allows the user to perform a one-click purchase of the book.

Figure 8:
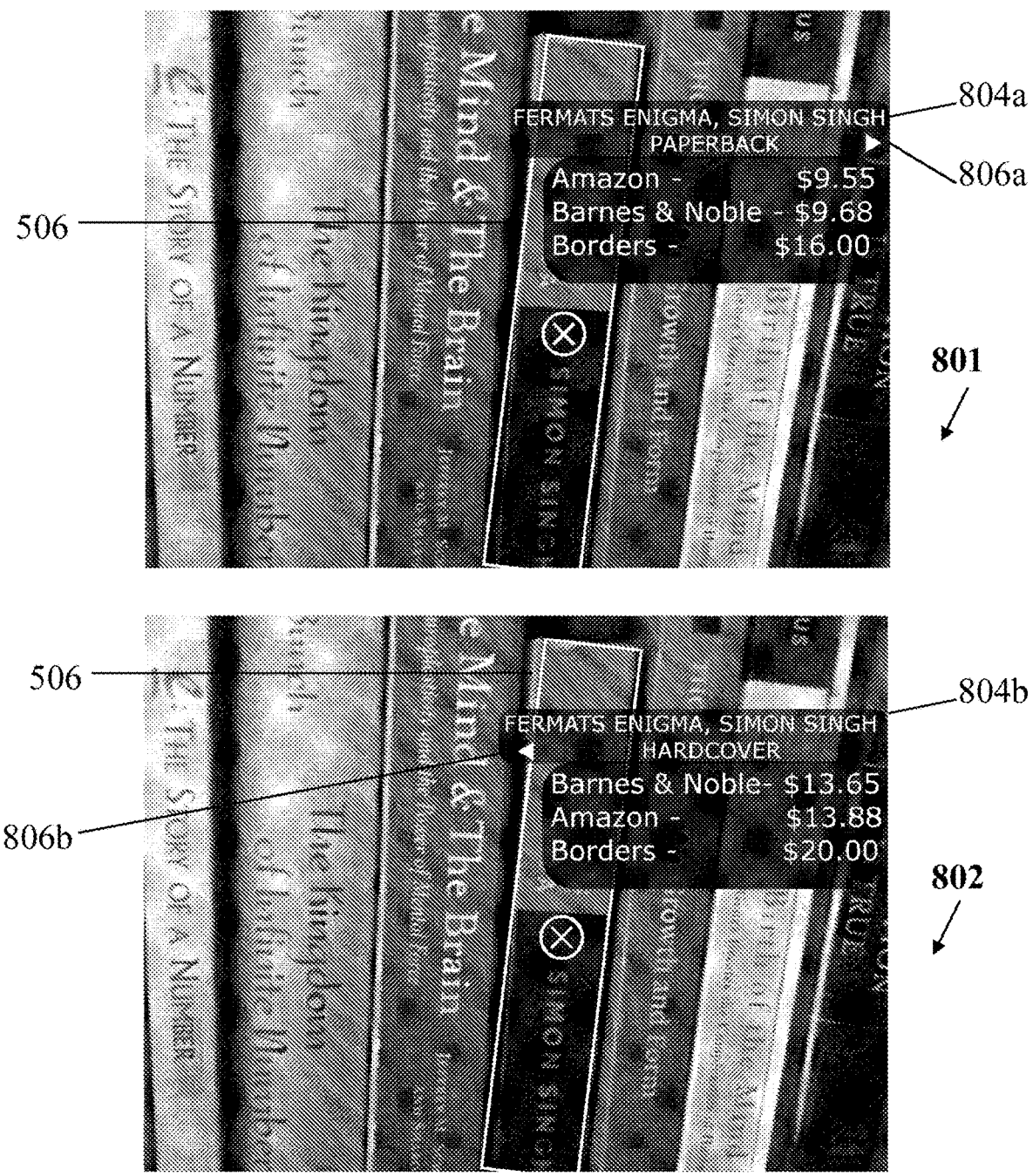
FIG. 8 illustrates alternate final sequences of stages of the live image capture user interface where the user performs an action on an image of an object sampled from the surrounding environment.

FIG. 8 illustrates alternate final sequences of stages of the live image capture user interface in which the user performs an action on an image of an object sampled from the surrounding environment. Images 801, 802 illustrate a scenario where there is ambiguity in the object being interpreted. The ambiguity is due to the existence of a hardcover and a paperback version of a book. (If the barcode or ISBN had been visible, the present system could have resolved this ambiguity.) Ambiguity can arise due to other reasons, including an erroneous or incomplete scan resulting in multiple objects qualifying as candidates. In one embodiment, the input interface shows object of interest 506 and associated actions 804a, 804b with visual cues to navigate through. Example visual cues include arrows 806a, 806b. Optionally, if the list of associated actions is above a threshold count, the input interface instead displays a results list similar to a search results listing interface. In another embodiment, the input interface prompts the user to scan the object of interest 506 again. In some implementations, the input interface shows the qualifying list of objects only after resolving the optical recognition input using the context factors, so as to eliminate noisy input. For example, if the mobile device's location is in a bookstore, the present system uses the library of digital information on books available on the store's online site as context factors to resolve the optical recognition input. Using these contextual factors potentially reduces the list of qualifying objects.

FIG. 9 illustrates the live image capture user interface in which the user performs an action on an image of a page of a book sampled from the surrounding environment. Images 901, 902, 903 illustrate a scenario where there is no context other than the image content itself. Image 901 illustrates the user sampling a page of a book. Image 902 illustrates the user focusing cross-hairs 504 on a word in a book, the word "vignette." In some embodiments, the present system allows the user to eliminate surrounding words from the field of view by zooming in on the word to cull the field of view. Image 903 illustrates that, once image recognition is complete, the present system stops blinking cross-hair 504 and transiently ceases live capture by displaying a frozen image. The frozen image includes displaying the word meaning 904a, along with an option 904b to explore further using a search option. Pursuing search option 904b leads to a traditional text-input-based search interface with results. Freezing the image upon recognition avoids requiring effort from the user to continue to keep the object of interest on the focus of cross-hair 504. Accordingly, stopping the blinking of cross-hair 504 informs user that he can stop trying to focus on the object and, instead, may act on the actionables displayed.

As described above, the present cross-hair live capture with incremental recognition facilitates a variety of use cases spanning different object sizes. A user can scan a single word in a paragraph of a book, or a large object where the user moves the cross-hair over the object to scan the entire object. While the examples described above of using a cross-hair to pin-point an object have all been in the immediate proximity of the user, the present system also facilitates allowing the user to focus on and identify an object far away on the visual horizon. For example, a user visiting a national park tries to identify a monument or a mountain on the visual horizon. Since the present system leverages the location of the device as a contextual factor, the present system improves image recognition and matching of the image of interest with existing images of the monument or mountain to improve the recognition success rate. In further embodiments, the present system uses a magnetometer present in the device to further assist in identifying a vantage point of the user in addition to the location, so as to discern the visual horizon.

Use of OCR (Optical Character Recognition) and barcode recognition alone, or combined with a context of location and time, make the present centralized image-based-input interface useful for acting on objects in the user's immediate surrounding visual environment, since objects of interest may be text labeled. For example, in a store, text labels are text stuck on or imprinted on an object, or external labels adjacent to the object. Over time, recognizing object shapes regardless of orientation, lighting, surface deformities, or color would improve to enable recognizing objects that may not be text labeled. Accordingly, the value of the present interface increases as the quality of image recognition improves.

In some embodiments, the present system couples the present camera-based centralized input interface with a complementary text- or speech-based input interface to compensate for image recognition failures, or to rank and order actions or results which are coupled to or decoupled from the surrounding environment. As described above, the camera-based centralized input interface serves as improved expression of user intent in or coupled to the surrounding environment. In contrast, a complementary text or speech interface serves to capture user's intent decoupled from the surrounding environment. In some embodiments, these two interfaces complement each other as image recognition algorithms improve and the gap between image recognition by humans and machine recognition decreases. In the interim, optionally in scenarios where image recognition is deficient or fails, the present system reduces the text- or speech-based interface decoupling from the environment to compensate for image recognition failures, in specific instances when image recognition fails. In instances where image recognition does work, the text input interface remains decoupled from the surrounding environment, or minimally decreases relevance for results relevant to the immediate environment, in contrast to results decoupled from the immediate environment.

The techniques and systems disclosed herein may be implemented as a computer program product for use with a computer system or computerized electronic device (e.g., Smartphone, PDA, tablet computing device, etc.). Such implementations may include a series of computer instructions, or logic, fixed either on a tangible medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments may be implemented as a combination of both software (e.g., a computer program product) and hardware. Still other embodiments are implemented as entirely hardware, or entirely software (e.g., a computer program product).

Further still, any of the various process steps described herein that occur after the user has obtained a sample of the environment (e.g., an image, a sound recording, or other sensory input), can be processed locally on the device and/or on a server system that is remote from the user device. For example, upon latching onto an image, the digitized image can be transmitted to a remote server system for further processing consistent with the disclosure above. Optionally, or alternatively, the image can be processed locally on the device and compared to a locally resident database of information. Thus, possible candidate for a match to the latched image can come from local and/or remote sources for presentation to the user.

What is claimed is:

1. A method, the method comprising:
   identifying a plurality of objects in an image being captured by an image capture device of a user device, based on:
   identifying a location of the user device;
   identifying a database corresponding to the location of the user device; and
   compensating for errors in identifying the plurality of objects based on the database;
   identifying an object of interest, from the plurality of objects in the image, based on location of the object of interest within a frame of the image;
   identifying, based on a non-textual portion of the object of interest and context relating to the image, an action, from a plurality of actions, for subsequent selection by a user; and
   generating for display the action to the user as a selectable option.

2. The method of claim 1, wherein the action is a subset of actions identified from the plurality of actions based on the object of interest and the context relating to the image, and wherein generating for display the selectable option comprises generating for display a plurality of selectable options corresponding to the subset of actions.

3. The method of claim 2, further comprising:
   ranking each action of the subset of actions based on the non-textual portion of the identified object of interest, wherein generating for display the plurality of selectable options includes ordering the subset of actions based on the ranking.

4. The method of claim 3, further comprising selecting a highest ranking action within the subset of actions in response to user selection of a button.

5. The method of claim 1, wherein identifying the object of interest further comprises augmenting the context relating to the image based on at least one of the location of the user device and a location at which the image was taken.

6. The method of claim 5, wherein the action comprises an option to purchase an item corresponding to the object of interest from an online storefront corresponding to a physical storefront that is proximate to the location of the user device or the location at which the image was taken.

7. The method of claim 1 further comprising graphically accentuating a perimeter of the object in response to identifying the object.

8. The method of claim 1, further comprising:
storing the image to a memory along with data about at least one of the location of the user device, the date at which the image was captured, and the time at which the image was captured at a first point in time; and
presenting the action at a second point in time when the user later acts upon the stored image after the first point in time.

9. The method of claim 1, further comprising:
receiving a user selection of the action; and
updating a profile associated with the user to include information about the selected action.

10. The method of claim 1, further comprising:
generating for display a visual guide overlaying the image being captured by the image capture device in response to detecting that motion of the user device falls below a threshold value.

11. A system, the system comprising control circuitry configured to:
identify a plurality of objects in an image being captured by an image capture device of a user device, based on identifying a location of the user device;
identifying a database corresponding to the location of the user device; and
compensating for errors in identifying the plurality of objects based on the database;
identify an object of interest, from the plurality of objects in the image, based on a location of the object of interest within a frame of the image;
identify, based on a non-textual portion of the object of interest and context relating to the image, an action, from a plurality of actions, for subsequent selection by a user; and
generate for display the action to the user as a selectable option.

12. The system of claim 11, wherein the action is a subset of actions identified by the control circuitry from the plurality of actions based on the object of interest and the context relating to the image, and wherein the control circuitry, when generating for display the selectable option, is further configured to generate for display a plurality of selectable options corresponding to the subset of actions.

13. The system of claim 12, wherein the control circuitry is further configured to:
rank each action of the subset of actions based on the non-textual portion of the identified object of interest, wherein generating for display the plurality of selectable options comprises ordering the subset of actions based on the ranking.

14. The system of claim 13, wherein the control circuitry is further configured to select a highest ranking action within the subset of actions in response to user selection of a button.

15. The system of claim 11, wherein the control circuitry is further configured, when identifying the object of interest, to augment the context relating to the image based on at least one of the location of the user device and a location at which the image was taken.

16. The system of claim 15, wherein the action comprises an option to purchase an item corresponding to the object of interest from an online storefront corresponding to a physical storefront that is proximate to the location of the user device or the location at which the image was taken.

17. The system of claim 11, wherein the control circuitry is further configured to graphically accentuate a perimeter of the object in response to identifying the object.

18. The system of claim 11, wherein the control circuitry is further configured to:
store the image to a memory along with data about at least one of the location of the user device, the date at which the image was captured, and the time at which the image was captured at a first point in time; and
present the action at a second point in time when the user later acts upon the stored image after the first point in time.

19. The system of claim 11, wherein the control circuitry is further configured to:
receive a user selection of the action; and
update a profile associated with the user to include information about the selected action.

20. The system of claim 11, wherein the control circuitry is further configured to generate for display a visual guide overlaying the image being captured by the image capture device in response to detecting that motion of the user device falls below a threshold value.

* * * * *